United States Patent
Crabtree et al.

(10) Patent No.: US 7,172,369 B2
(45) Date of Patent: Feb. 6, 2007

(54) METHODS FOR ALIGNING PIPES AND CONNECTING THE LINED PIPE WITH ADJACENT OR LATERAL PIPES

(75) Inventors: John Douglas Crabtree, Gainesville, TX (US); James Lewis Tate, Scott, LA (US)

(73) Assignees: Pipe Liners, Inc., New Orleans, LA (US); Weatherford U.S.L.P., Houston, TX (US)

( * ) Notice: Subject to any disclaimer, the term of this patent is extended or adjusted under 35 U.S.C. 154(b) by 0 days.

(21) Appl. No.: 11/390,238

(22) Filed: Mar. 28, 2006

(65) Prior Publication Data

US 2006/0182500 A1    Aug. 17, 2006

Related U.S. Application Data

(62) Division of application No. 11/056,235, filed on Feb. 14, 2005, now Pat. No. 7,037,043.

(51) Int. Cl.
*F16L 551/16* (2006.01)

(52) U.S. Cl. .............................. 405/184.2; 405/184.1; 138/97

(58) Field of Classification Search ............... 405/156, 405/184.1, 184.2; 138/97, 98
See application file for complete search history.

(56) References Cited

U.S. PATENT DOCUMENTS

| | | | |
|---|---|---|---|
| 1,343,463 A | 6/1920 | Thomas | |
| 1,649,752 A | 11/1927 | Stone | |
| 4,049,480 A | 9/1977 | Kutschke | |
| 4,064,211 A | 12/1977 | Wood | |
| 4,235,259 A * | 11/1980 | Hudock | ........................ 138/97 |
| 4,687,233 A | 8/1987 | Edwards | |
| 4,714,095 A | 12/1987 | Muller et al. | |
| 4,780,163 A * | 10/1988 | Haneline et al. | ............... 156/94 |
| 4,863,365 A | 9/1989 | Ledoux et al. | |
| 4,907,911 A * | 3/1990 | Rodriguez et al. | ........ 405/184.2 |
| 4,985,196 A | 1/1991 | LeDoux et al. | |
| 4,986,951 A | 1/1991 | Ledoux et al. | |
| 4,998,871 A | 3/1991 | Ledoux | |
| 5,091,137 A | 2/1992 | Ledoux | |
| 5,342,570 A | 8/1994 | Ledoux et al. | |
| 5,385,173 A | 1/1995 | Gargiulo | |

(Continued)

FOREIGN PATENT DOCUMENTS

GB        2080916        *    2/1982

(Continued)

*Primary Examiner*—Sunil Singh
(74) *Attorney, Agent, or Firm*—Nixon & Vanderhye P.C.

(57) ABSTRACT

A deformed thermoplastic liner is drawn through a cut host pipe and split sleeve halves attached to it and then reformed to its cylindrical configuration using pressurized steam. The split sleeve halves are removed, and an adapter flange is fused onto a cut end of the liner portion. The split sleeves halves are then re-attached with the adapter flange between bolted flanges of the split sleeve halves and a section welded to the adjacent host pipe to provide a permanent pressure sealed connection. The lined host pipe can also be connected to a lateral pipe using a lateral extension fused to the rerounded liner and a third split sleeve half with a lateral pipe extension that receives the lateral extension and is attached to the lateral pipe, either directly, or through a second split sleeve.

18 Claims, 13 Drawing Sheets

U.S. PATENT DOCUMENTS

| | | |
|---|---|---|
| 6,167,912 B1 | 1/2001 | Stephens |
| 6,612,341 B2 * | 9/2003 | Vu .............................. 138/99 |
| 6,615,859 B2 * | 9/2003 | Sato et al. ............... 137/15.14 |
| 6,705,801 B1 * | 3/2004 | Kiest, Jr. .................. 405/184.1 |
| 6,901,967 B1 * | 6/2005 | Kuenzer ...................... 138/99 |
| 2006/0137756 A1 * | 6/2006 | Rice ............................ 138/99 |

FOREIGN PATENT DOCUMENTS

JP        06221494        8/1994

* cited by examiner

METHODS FOR ALIGNING PIPES AND CONNECTING THE LINED PIPE WITH ADJACENT OR LATERAL PIPES This application is a divisional of application Ser. No. 11/056,235, filed Feb. 14, 2005, now U.S. Pat. No. 7,037,043, the entire contents of which are hereby incorporated by reference in this application.

BACKGROUND OF THE INVENTION

The present invention relates to methods for lining pipes and connecting the lined pipe with adjacent or lateral pipes and particularly relates to methods for terminating liners to known dimensions to facilitate flanged or flared terminal connections with the adjacent or lateral pipes.

Methods for lining a host pipe, such as a concrete sewer line or a pressure pipe, with a thermoplastic liner are well known. One such system for lining pipes involves the manufacture of generally cylindrical pipe liners formed of extruded thermoplastic material. After extrusion, the cylindrical liners are shaped to reduce their cross-sectional envelope. Various methods and apparatus have been used to deform the initially extruded cylindrical liners into various cross-sectional configurations, for example, H, X, U and V cross-sections. A generally U-shaped liner, however, has been found to be most useful, practical and economical. Thus, the extruded cylindrical liner is shaped at the manufacturing site to a substantially reduced U-shaped cross-sectional configuration.

Subsequent to the manufacture of the deformed liner, the liner is typically coiled on a reel for transport to a job site. Alternatively, the deformed liner may be transported in linear lengths to the job site. At the job site, the deformed thermoplastic liner is conventionally pulled inside a pipe to be lined, i.e., a host pipe and the liner is then restored to its initially extruded cylindrical configuration with its outer cylindrical surface bearing against the interior cylindrical surface of the host pipe wall. The restoration of the deformed liner to its original cylindrical configuration is often carried out by the introduction of steam into the liner while in the host pipe whereby the liner is reformed to its cylindrical configuration and lines the host pipe. A well known system for lining pipes with a generally U-shaped liner which is reconfigured into a cylindrical liner upon installation is disclosed in various patents, namely U.S. Pat. Nos. 4,985,196; 4,863,365; 4,986,951; 4,998,871; 5,342,570; and 5,091,137, the subject matters of which are incorporated herein by reference.

To line underground pipes, particularly pressure pipes, i.e. pipes for transmitting fluid under pressure, it is important to provide terminal ends of the liner with known dimensions, e.g. inner and outer diameters and wall thicknesses. The dimensions of the liner when rerounded from the generally U-shaped configuration to a cylindrical configuration lining the host pipe cannot be controlled absent containment or constraints. Otherwise, the wall thickness of the uncontained and unconstrained liner will vary and the pipe may blow out entirely. Also, the inner and outer diameters of the liner cannot be controlled. It will be appreciated that the end of the liner must be flared or provided with known dimensions so that additional liner sections can be fused to the liner end. This is particularly important when lining pressure pipes which require the space between the inner diameter of the host pipe and the outer diameter of the liner to be sealed and particularly at the pipe joints. Otherwise the pressure of the fluid within the lined pipe could destroy the liner. Accordingly, there has developed a need for providing a method of terminating liners, preferably for underground pipe lines, which may or may not be pressure lines, to known dimensions such that flanged or flared terminal connections can be provided to adjacent or lateral pipes.

BRIEF SUMMARY OF THE INVENTION

In a preferred embodiment of the present invention, there is provided a method of lining a host pipe having a cylindrical cross-section and connecting the lined pipe with an adjacent pipe comprising the steps of: (a) securing a split sleeve to an end of the host pipe to form a generally axial cylindrical extension thereof, the split sleeve including longitudinally extending sleeve halves; (b) providing a liner having a non-cylindrical cross-section within the host pipe and the split sleeve; (c) reforming the non-cylindrical liner within the host pipe and the split sleeve to generally conform the liner to the inner diameters of the cylindrical host pipe and the split sleeve; (d) removing the split sleeve halves from about a reformed end portion of the liner within the split sleeve; (e) cutting the liner end portion to a predetermined length; (f) providing a flange on the end of the reformed cut liner end portion; (g) securing the split sleeve about the cut liner end portion; and (h) securing the adjacent pipe or an extension of the adjacent pipe and the split sleeve to one another at an end of the split sleeve remote from the end of the host pipe and with the liner end portion flange between the split sleeve and the adjacent pipe.

In a further embodiment of the present invention, there is provided a method of lining a host pipe having a cylindrical cross-section and connecting the lined host pipe with a lateral pipe, comprising the steps of: (a) removing an intermediate section of the host pipe at a location in general registration with the lateral pipe leaving spaced opposed ends of the host pipe; (b) removing an end portion of the lateral pipe and forming a connecting end thereon; (c) securing a split sleeve to the opposed ends of the host pipe to form a continuation of the host pipe, the split sleeve including longitudinally extending halves; (d) inserting a thermoplastic liner having a non-cylindrical cross-section into the host pipe and split sleeve; (e) reforming the liner within the host pipe and split sleeve to generally conform the liner to the inner diameter of the cylindrical host pipe and the inner diameter of the split sleeve; (f) removing at least one of the split sleeve halves thereby generally registering a side portion of the reformed liner and the connecting end of the lateral pipe with one another; (g) fusing a thermoplastic pipe section to the registering side portion of the liner; (h) forming an opening in the side portion of the reformed liner in communication with the pipe section fused to the liner; (i) securing a third split sleeve half between said opposite ends of the host pipe and overlying the registering side portion of the reformed liner, said third split sleeve half having a lateral pipe extension receiving the thermoplastic pipe section fused to said liner; (j) securing a flange to a distal end of the fused pipe section; and (k) securing the connecting end of the lateral pipe to the lateral pipe extension with the flange therebetween.

DETAILED DESCRIPTION OF THE INVENTION

Figure 1:
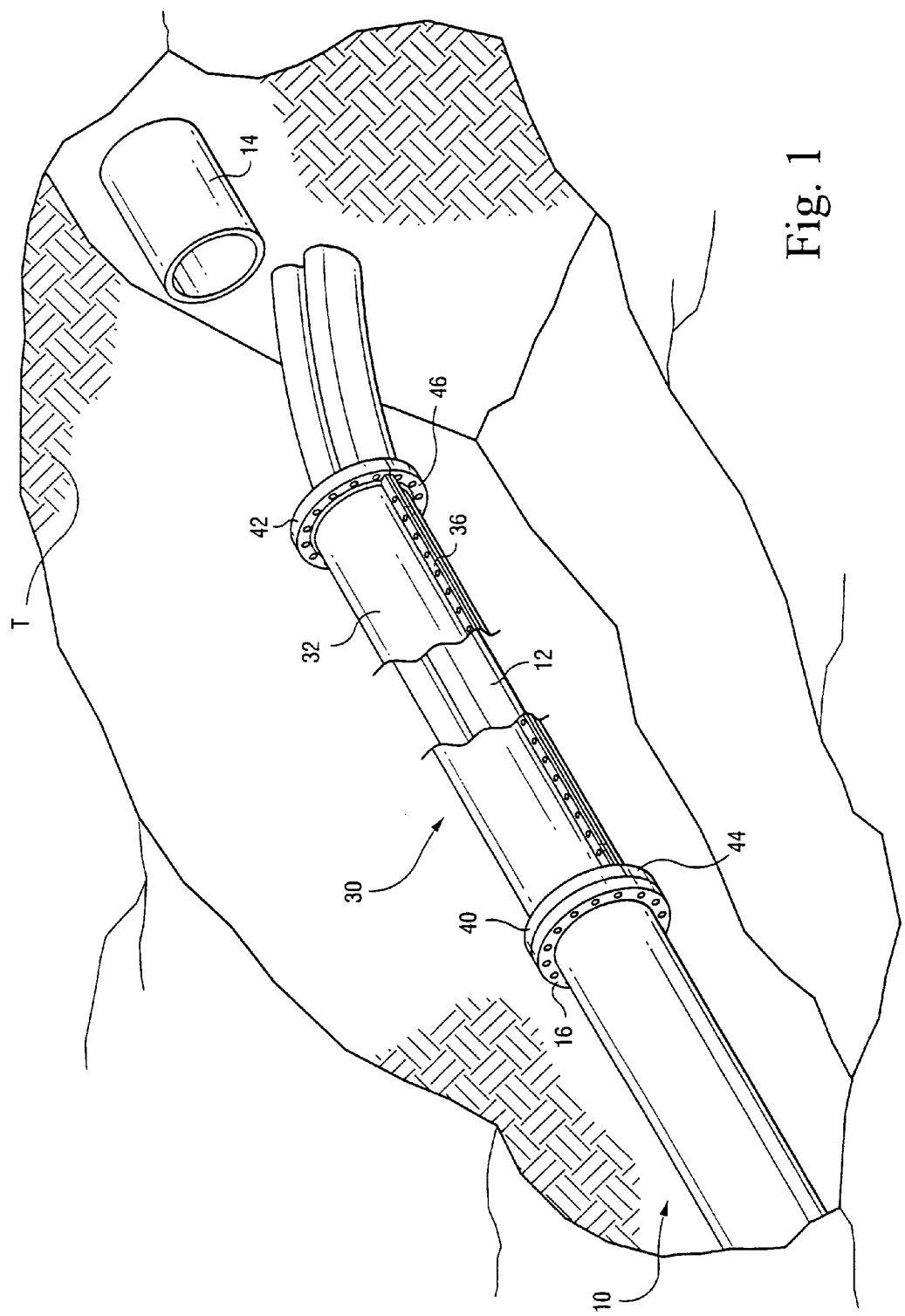
FIG. 1 is a fragmentary perspective view of an underground host pipe which is to be lined and connected to an adjacent pipe and illustrating features of the present invention.

Referring to the drawing figures, particularly to FIG. 1, there is illustrated a host pipe generally designated 10 and which host pipe is to be lined with a thermoplastic liner 12. The host pipe 10 and an adjacent pipe 14 typically comprise underground sections of a run of a unitary pipeline in which an intermediate section of the pipe run has previously been removed from the pipe run to facilitate lining the host pipe 10 and securing the lined host pipe to the adjacent pipe 14. The host pipe 10 thus requires lining while the remaining section, i.e. the adjacent pipe 14, may or may not require lining. Also, while a flange 16 is illustrated in FIG. 1 at the end of the host pipe 10 and a flange 18 (FIG. 5) is secured to the adjacent pipe 14, typically the flanges 16 and 18 are applied in the course of lining the host pipe and connecting the host pipe and adjacent pipe to one another as described below. There are, however, existing pipe lines which terminate in an underground manhole and have existing flanges at their ends which may be utilized in the course of lining one or both of the pipes.

The present invention is particularly applicable to metal pressure pipes, i.e. pipes carrying a fluid under pressure, although it will be appreciated that the method described herein can be employed in non-pressure pipes. Also, the apparatus and methods disclosed herein are particularly applicable to underground pipes, although they may be used in other environments. Thus the drawing figures illustrate the pipes 12 and 14 and the split sleeve 30 in an underground trench T.

As illustrated in FIG. 1, the host pipe 10 and adjacent pipe 14 are generally cylindrical in cross-section and are formed of metal in pressure pipe applications. The host pipe 10 is also illustrated being lined with the deformed liner 12. Liner 12 may be formed of a thermoplastic material. e.g., polyethylene at a manufacturing site where the liner is extruded into cylindrical cross-sections and deformed to reduce its cross-sectional envelope so that the liner 12 can be received in and passed through host pipe and subsequently rerounded or returned to its original cylindrical cross-sectional configuration into contact with the inner diameter walls of the host pipe. Apparatus and processes for forming the thermoplastic liner 12 and installing the liner in host pipes are described and illustrated in the above-identified U.S. patents. Suffice to say that the reduced cross-sectional configuration of the liner 12 may be of a variety of non-cylindrical shapes, such as H, U, C and V shapes. The present description of the invention, however, goes forward using the U-shaped configuration as an exemplary embodiment of this aspect of the invention and as an example of the various other cross-sectional shapes of the liner which may be utilized.

Figure 2:
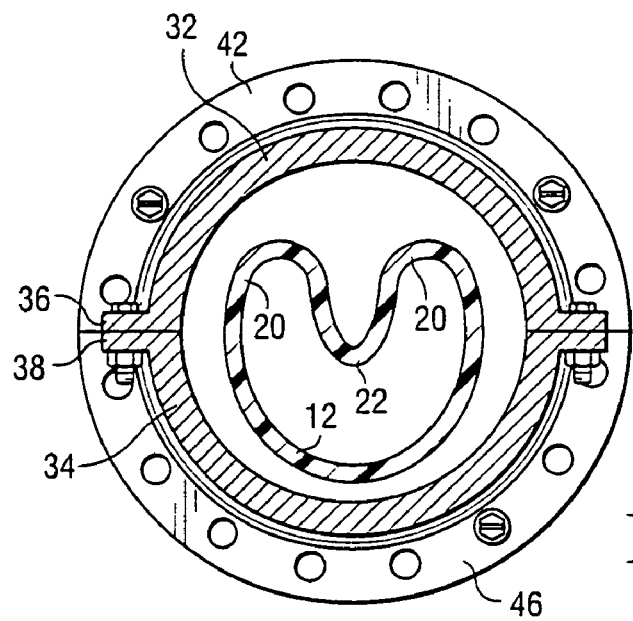
FIG. 2 is a cross-sectional illustration of a deformed pipe liner prior to being rerounded and passing through a longitudinally extending split sleeve according to an aspect of the present invention.

Referring to FIG. 2, the deformed liner 12 has a cross-section including a pair of side lobes 20 which straddle a single radially inwardly directed central lobe 22 forming the generally U-shaped cross-sectional configuration. When a liner having this generally U-shaped cross-sectional configuration arrives at an installation site, typically but not necessarily carried on a reel from the manufacturing site to the installation site, the liner may be uncoiled from the reel and drawn into the host pipe from one end and along the host pipe and a split sleeve 30 (FIG. 1) connected to the host pipe end. In FIG. 1, the liner 12 is illustrated as having been drawn through the host pipe 10 and an end portion of the liner is illustrated passing through the split sleeve 30 and projecting from an end of the split sleeve 30.

To obtain terminal portions of the liner of known dimensions, e.g. known wall thicknesses, and inner and outer diameters, in accordance with a preferred aspect of the present invention and prior to drawing the liner through host pipe 10, the split sleeve, is initially secured to the end of the host pipe 10. The split sleeve 30 includes a pair of longitudinally extending semi-cylindrical sleeve halves 32 and 34, each having longitudinally extending flanges 36 and 38 respectively along their margins. Additionally, each half 32 and 34 of the split sleeve 30 includes end flanges. For example, split sleeve half 32 includes flanges 40 and 42 at opposite ends respectively while split sleeve 34 includes flanges 44 and 46 at opposite ends. It will be appreciated that the flanges 40, 42, 44 and 46 are semi-circular. The marginal flanges 36 and 38 are provided with bolt holes to enable securement of the split halves 32 and 34 to one another. Flanges 40, 44 and 42, 46 likewise have bolt holes to enable respective securement to the flanges 16 and 18 at the opposed ends of the host pipe 10 and adjacent pipe 14. In FIG. 1, the split sleeve halves 32, 34 are illustrated secured to one another and are also secured at one end to host pipe 10, e.g. by bolting flanges 40, 44 to the flange 16 of the host pipe 10. It will be appreciated that the flange 16 may be welded directly to the end of host pipe 10 or form part of a pipe section terminating in flange 16 and welded to the end of the host pipe 10. Consequently the split sleeve 30 forms a generally axial cantilevered cylindrical extension of the host pipe 10 when secured thereto. Upon drawing liner 12 through the host pipe 10 and split sleeve 30, the split sleeve 30 surrounds the non-cylindrical, non-reformed end portion of the liner 12 projecting from host pipe 10. While preferably the split sleeve is secured to the host pipe prior to drawing liner 10 through the host pipe and split sleeve, the liner may be initially drawn through the host pipe and the split sleeve subsequently applied about a projecting end portion of the liner and secured to the host pipe flange 16.

Figure 3:
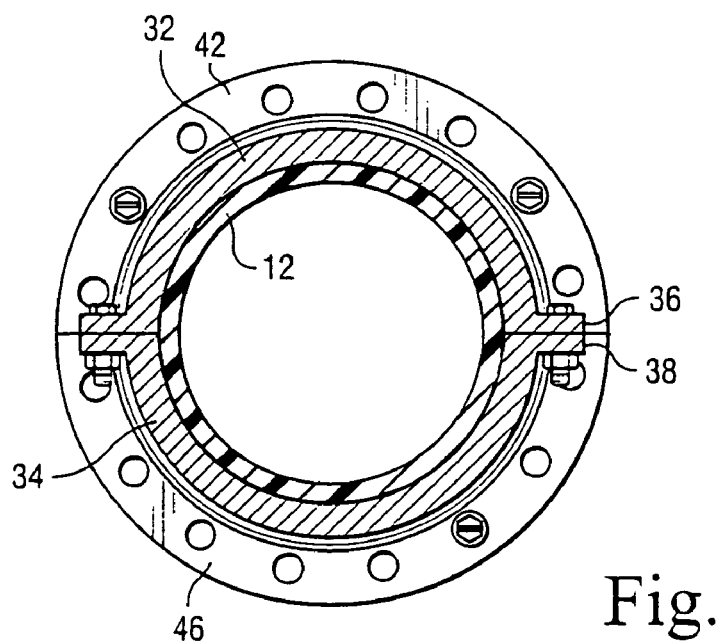
FIG. 3 is a view similar to FIG. 2 illustrating the liner in a rerounded generally cylindrical condition within the split sleeve.

With the split sleeve 30 about the end of the deformed, liner 12, connections, not shown, are made at opposite ends of the liner, to introduce a fluid, preferably steam, under pressure to reform or reround the liner 12 within the host pipe 10 and split sleeve 30 into a generally cylindrical configuration as illustrated in FIG. 3. Thus, the liner is rerounded in both the host pipe and the split sleeve.

Figure 4:
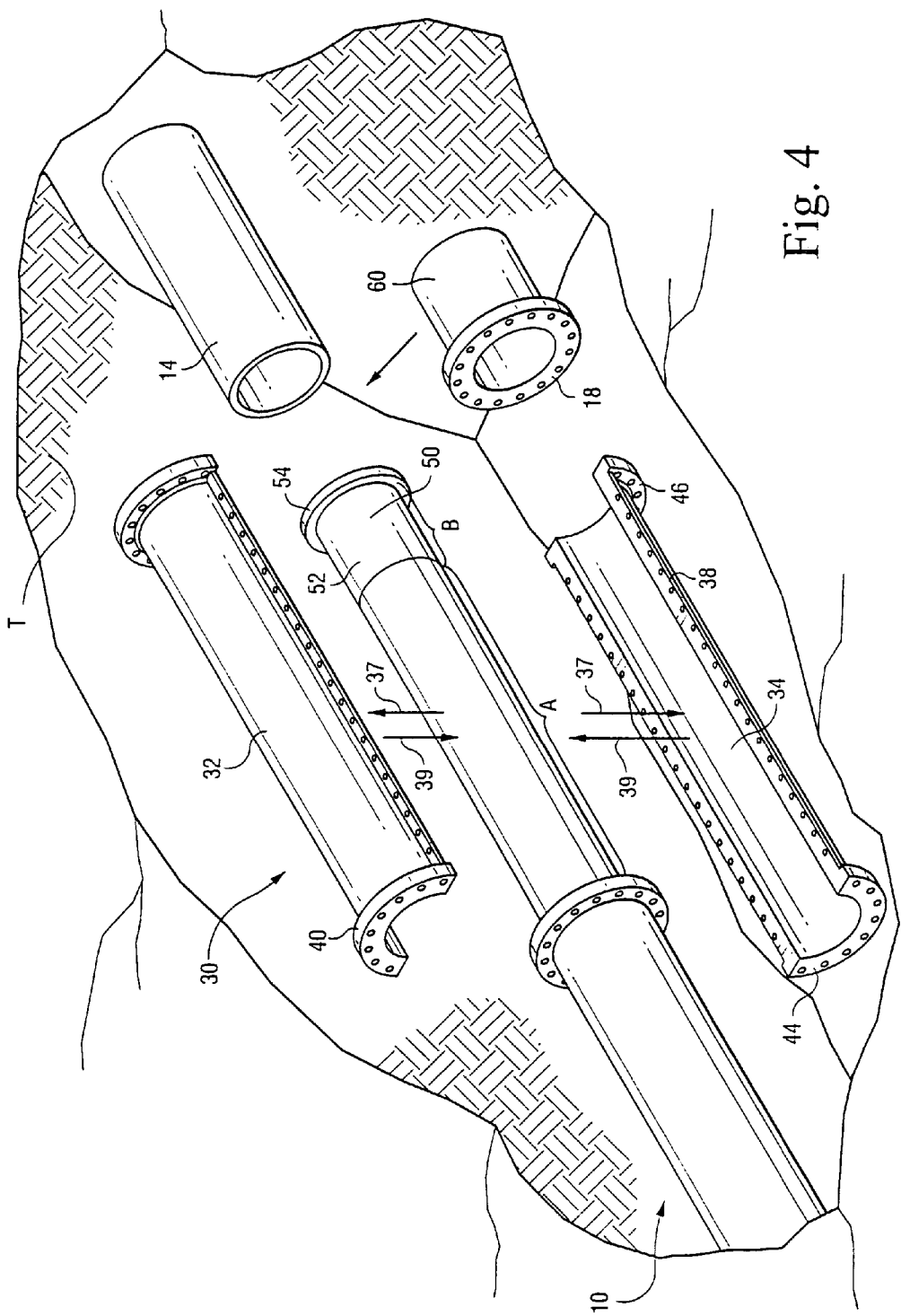
FIG. 4 is a schematic perspective view illustrating the removal of the split sleeve, the application of an adapter to the end of the rerounded liner, the reapplication of the split sleeve about the rerounded liner end portion and application of a flanged pipe section to an adjacent pipe.

With the liner rerounded within split sleeve 30, the split sleeve halves 32 and 34 are disconnected from one another and from the flange 16 of host pipe 10 and removed as illustrated by the set of arrows 37 in FIG. 4. It will be appreciated that the liner which was previously reformed within the split sleeve now exhibits inner and outer diameters and a wall thickness of known dimensions. It will also be appreciated that it is possible to cut the end of the liner projecting from the split sleeve without removing the split sleeve so that a flared flange may be formed on the end of the liner. Using a flaring tool, the end of the liner can be heated and flared back to overlie the axial end face of the flanges 42, 46 of the split sleeve 30 enabling direct connection between the flanges 42 and 46 of the split sleeve and the flange 18 of the adjacent pipe. However, this is very often difficult to achieve since the dimensions of even a small axial length necessary to form a flared portion cannot be controlled and the formation of a seal between the split sleeve becomes problematical.

Figure 5:
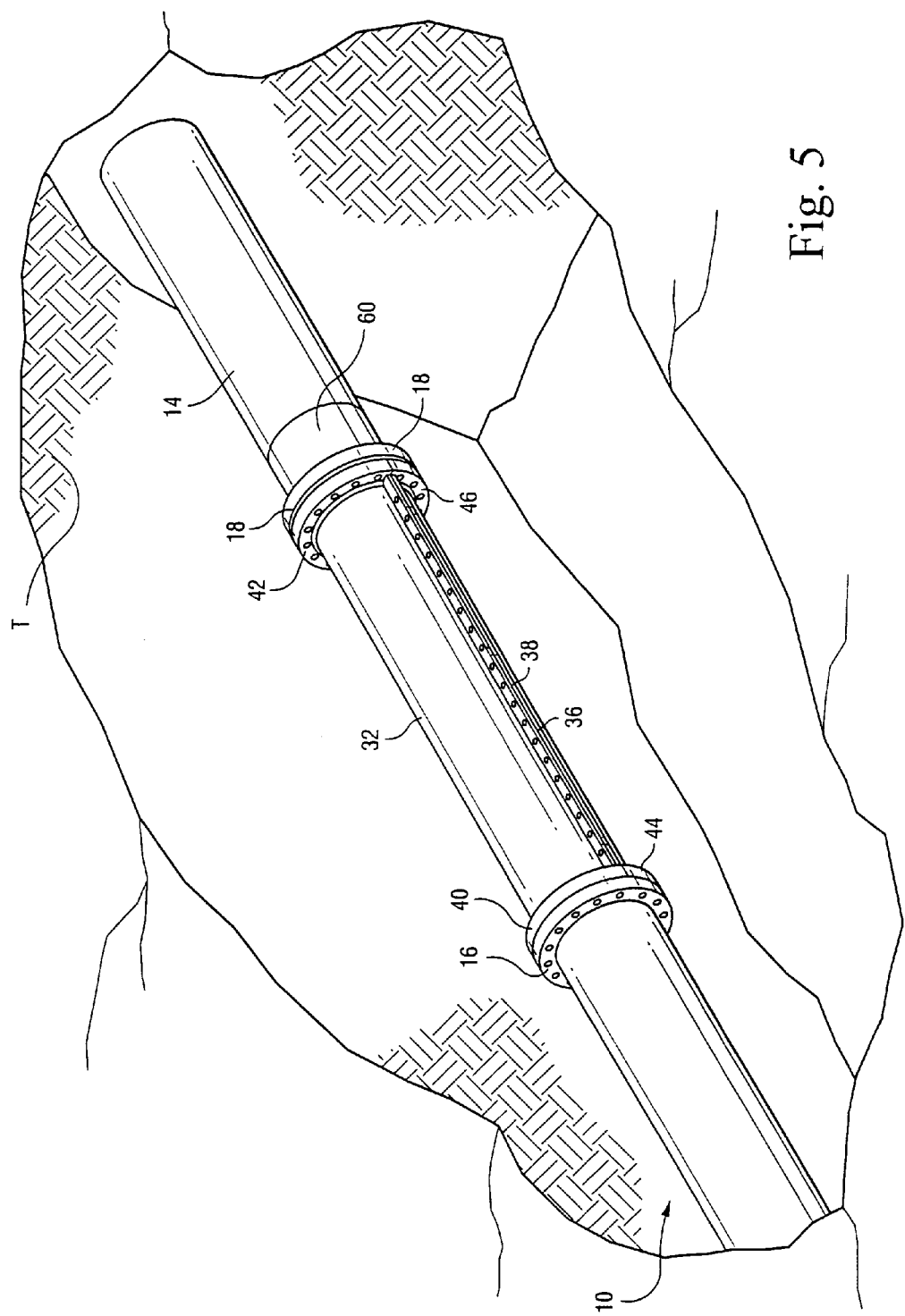
FIG. 5 is a perspective view of a completed lined host pipe connected to an adjacent unlined pipe in accordance with a preferred embodiment of the present invention.
Figure 6:
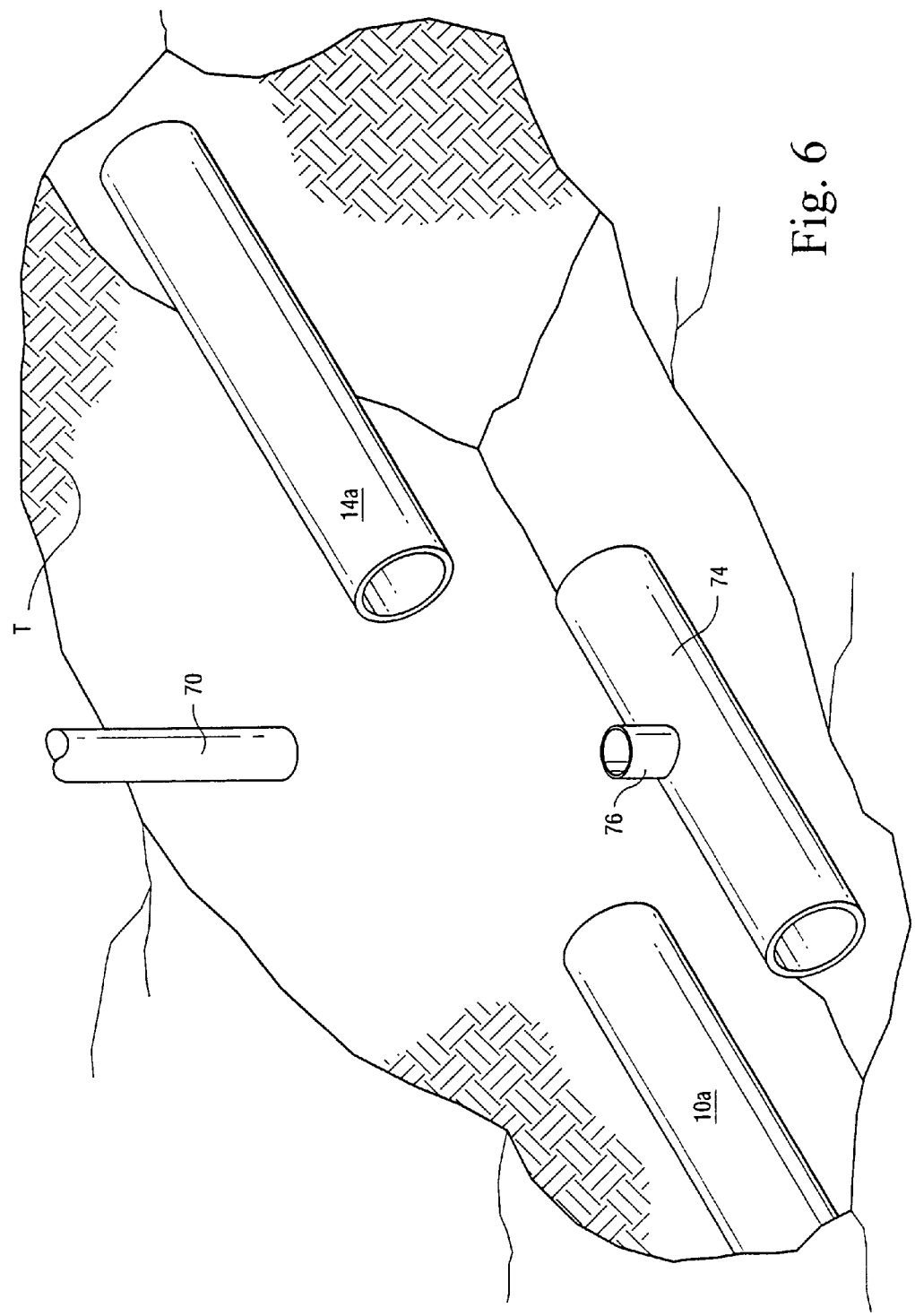
FIG. 6 is a perspective view illustrating the removal of a section of a host pipe prior to lining the host pipe and connecting the lined pipe to the lateral pipe.
Figure 7:
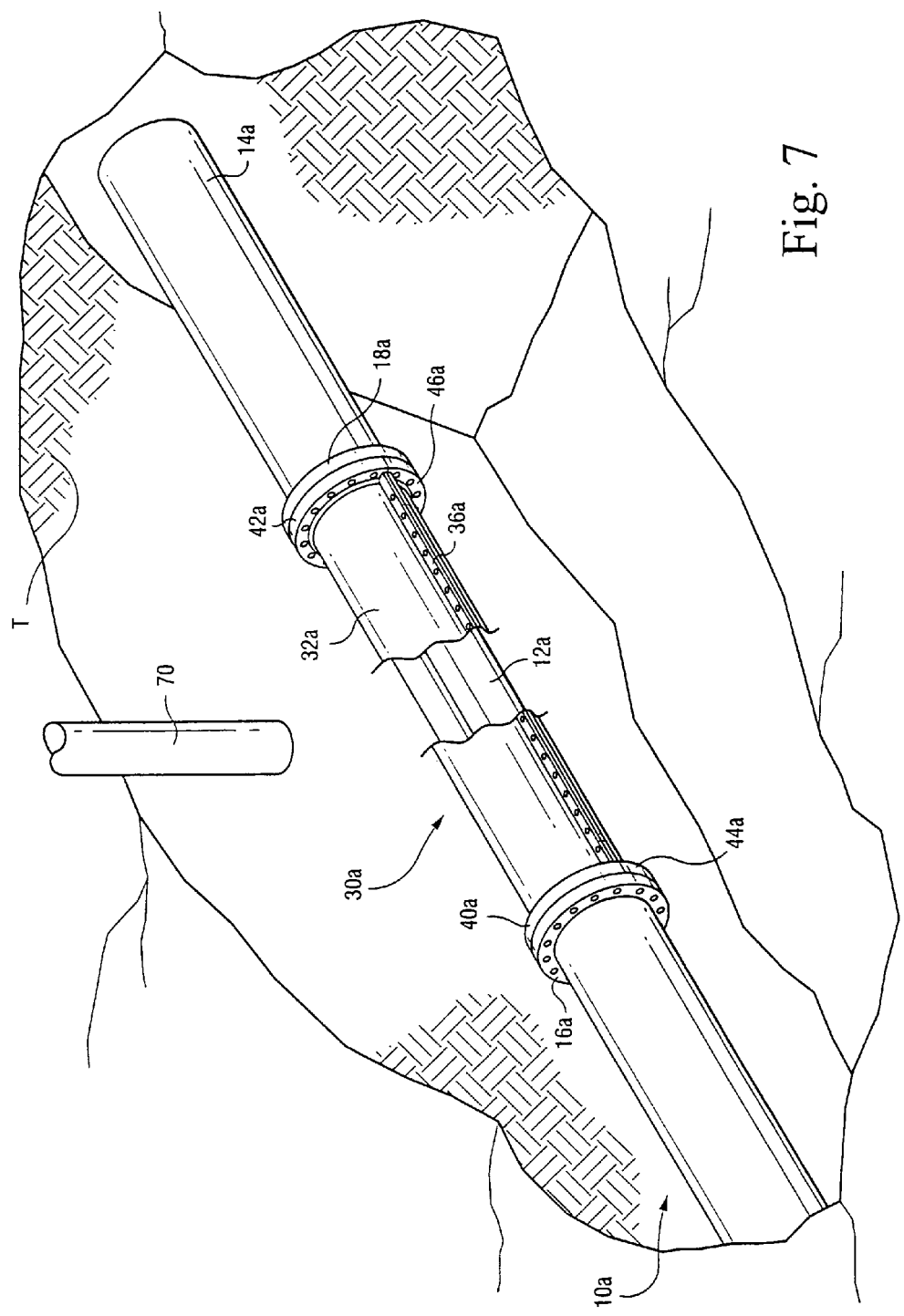
FIG. 7 is a perspective view illustrating the application of end flanges to the ends of the host pipe sections and the split sleeve to the host pipe end sections and subsequent insertion of the liner within the host pipe and split sleeve.
Figure 8:
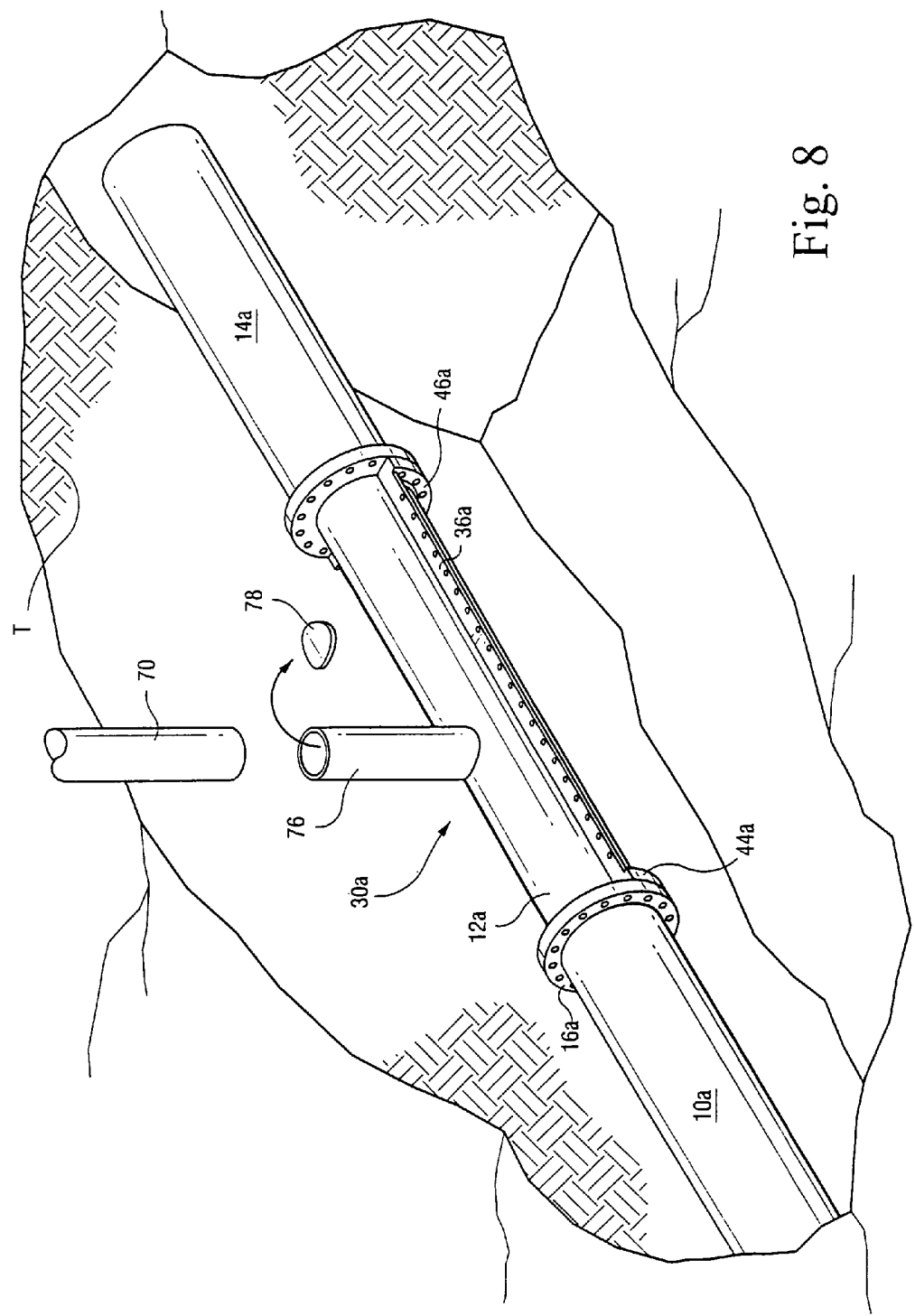
FIG. 8 is a perspective view illustrating removal of a split sleeve half, application of a thermoplastic adapter section to the rerounded liner and removal of a liner portion to form an opening between the liner and the adapter section.

Therefore, the split sleeve halves 32 and 34 are preferably removed from the reformed liner 12 as illustrated by the arrows at 37 in FIG. 4. Upon removal, the reformed liner end portion is cut back to a predetermined dimension (A) from the host pipe end. Since the cut back projecting end portion of the liner is of known dimensions, i.e. length, inner and outer diameters and wall thickness, a thermoplastic adapter 50 (FIG. 4) having a cylindrical extension 52 and a flange 54 formed at one end may be fused to the reformed liner end portion. Given the known dimensions of the cut liner end portion (including length (A) and the longitudinal length (B) of the split sleeve, adapter 50 can be preformed or cut to the appropriate length (B) such that the adapter flange 54 can be positioned accurately to bear against the axial end face of the split sleeve as illustrated in FIG. 5. It will be appreciated that since the adapter is 50 preformed to known dimensions, the dimensions of the flange 54 are accurately controlled. In the alternative, the reformed liner end portion may be cut exactly flush with the axial end face of the flanges 42 and 46. A flange similar to flange 54 but without the cylindrical extension 52 can then be fused on the end of the liner such that the fused flange is located a predetermined distance from the flange 16 of the host pipe, i.e. is positioned to fit snugly against the end face of the flanges 42, 46 of the split sleeve 30. As indicated previously, the split sleeve halves 32 and 34 are then reapplied about the rerounded liner 12 as indicated by the set of arrows 39 in FIG. 4, secured to one another by bolts passing through the flanges 36,38 and secured to the host pipe by bolts passing through flanges 40, 44 and flange 16. The flange 54 thus accurately bears snugly against the axial end face of flanges 42, 46 of the split sleeve 30. Note that the outer diameter of the flange 54 is less than the inner diameter of the bolt circle on the flanges 42, 46.

To connect the adjacent pipe 14 to the lined host pipe 10 and split sleeve 30, the adjacent pipe 14 may be initially or later cut back and a pipe section 60 terminating in flange 18 may be welded to pipe 14. It will be appreciated that the welded section 60 is of predetermined axial length to close the gap between the end of pipe 14 with the pipe section 60 secured thereto and flanges 42, 46. With the flanges 42, 46 and 18 bolted to one another and the trench T filled in, the installation is complete.

It will be appreciated that the flange 54 forms a seal bearing against both axial end faces of flanges 42, 46 and 18 preventing the pressure of fluid, flowing through the lined host pipe and split sleeve 30 and into pipe 14 from leaking into areas between the liner 12 and the host pipe 10 and split sleeve 30. The split sleeve, of course, remains as part of the underground pipe run since it forms part of the pressure containment for the portion of the liner within the split sleeve.

Referring now to FIGS. 6–11, there is illustrated a system for connecting a lined host pipe, e.g. a lined pressure pipe with a lateral 70. In this embodiment like reference numerals are applied to like parts as in the preceding embodiment followed by the letter a. In this embodiment, a host pipe 10a, e.g. a pressure pipe, is lined with a thermoplastic liner 12a as in the prior embodiment and connected to the lateral pipe 70 which may be lined or not lined. To accomplish this, a section 74 of the host pipe 10a including a section 76 of the lateral pipe 70 is removed from the host pipe 10a. As in the preceding embodiment, split sleeves 32a and 34a (FIG. 7) are secured to one another and to end flanges 16a and 18a formed on the registering end portions of the host pipe 10a. The flanges 16a and 18a may be welded onto the host pipe sections with or without cylindrical extending portions. With the split sleeves 32a and 34a secured to the host pipe 10a and adjacent pipe 14a, the liner 12a is drawn through the host pipe 10a split sleeve 30a and adjacent pipe 14a, and reformed to its original cylindrical configuration. Once reformed, the split sleeve half e.g. half 32a in registration with the lateral pipe 70 is removed. A lateral extension 76 formed of thermoplastic material is fused to the rerounded liner 12a exposed by the removal of the split sleeve half 32a. The portion 78 of the liner 12a within the fused margin of sleeve 76 is then removed by inserting a tapping tool through sleeve 76.

Figure 9:
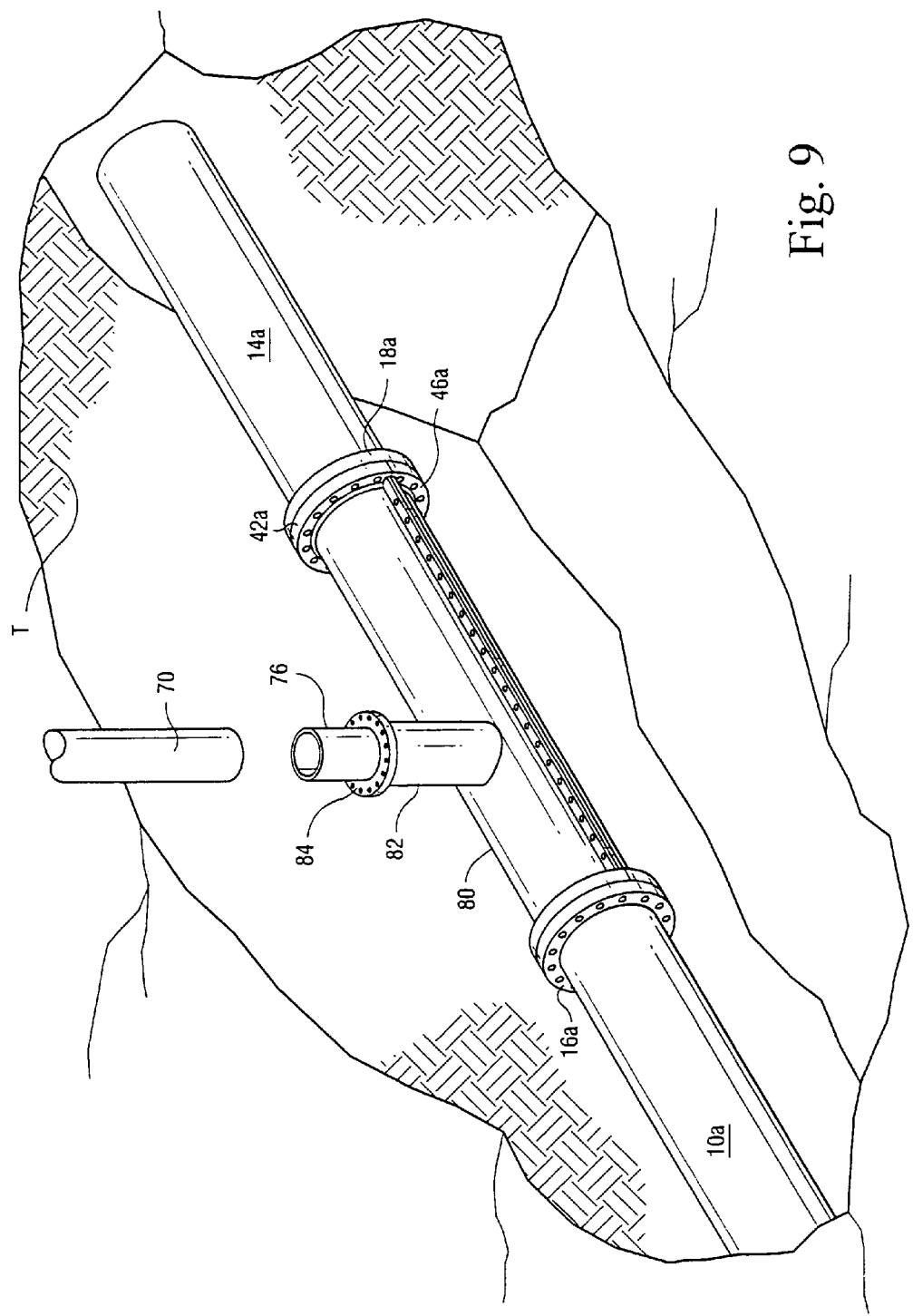
FIG. 9 is a perspective view illustrating application of a lateral connecting sleeve half to the rerounded liner.

Referring now to FIG. 9, a third split sleeve half 80 similar to split sleeve half 32a except that it has a lateral metal extension 82 terminating in a flange 84 is applied about the rerounded liner 12a with the sleeve 76 being received within the extension 82. The split sleeve 80 is then bolted to split sleeve 34a and to the end flanges 16a and 18a thus permanently enclosing the rerounded liner portion within the split sleeve.

Figure 10:
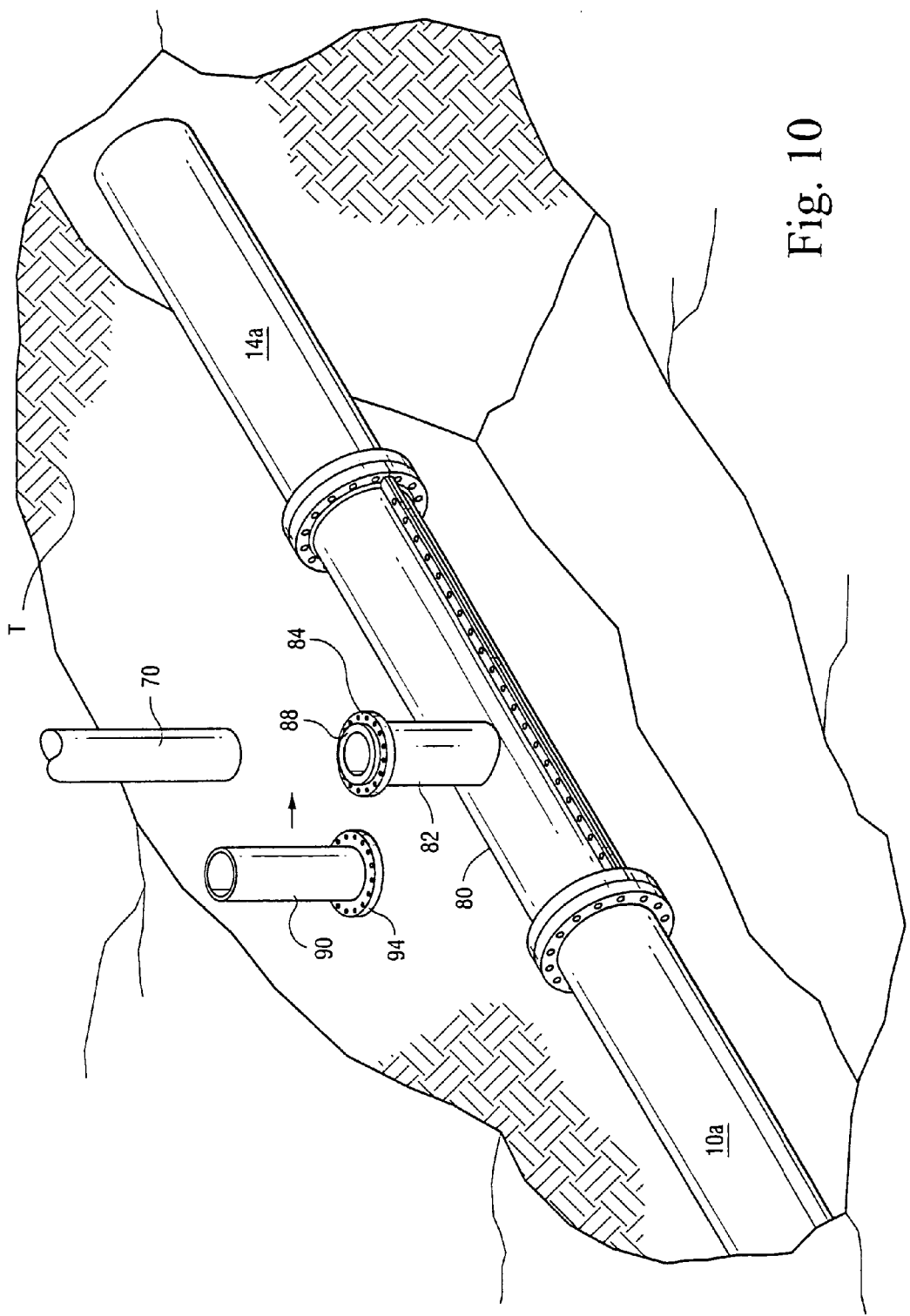
FIG. 10 is perspective view illustrating a flanged pipe section connecting between the lined pipe and the lateral.
Figure 11:
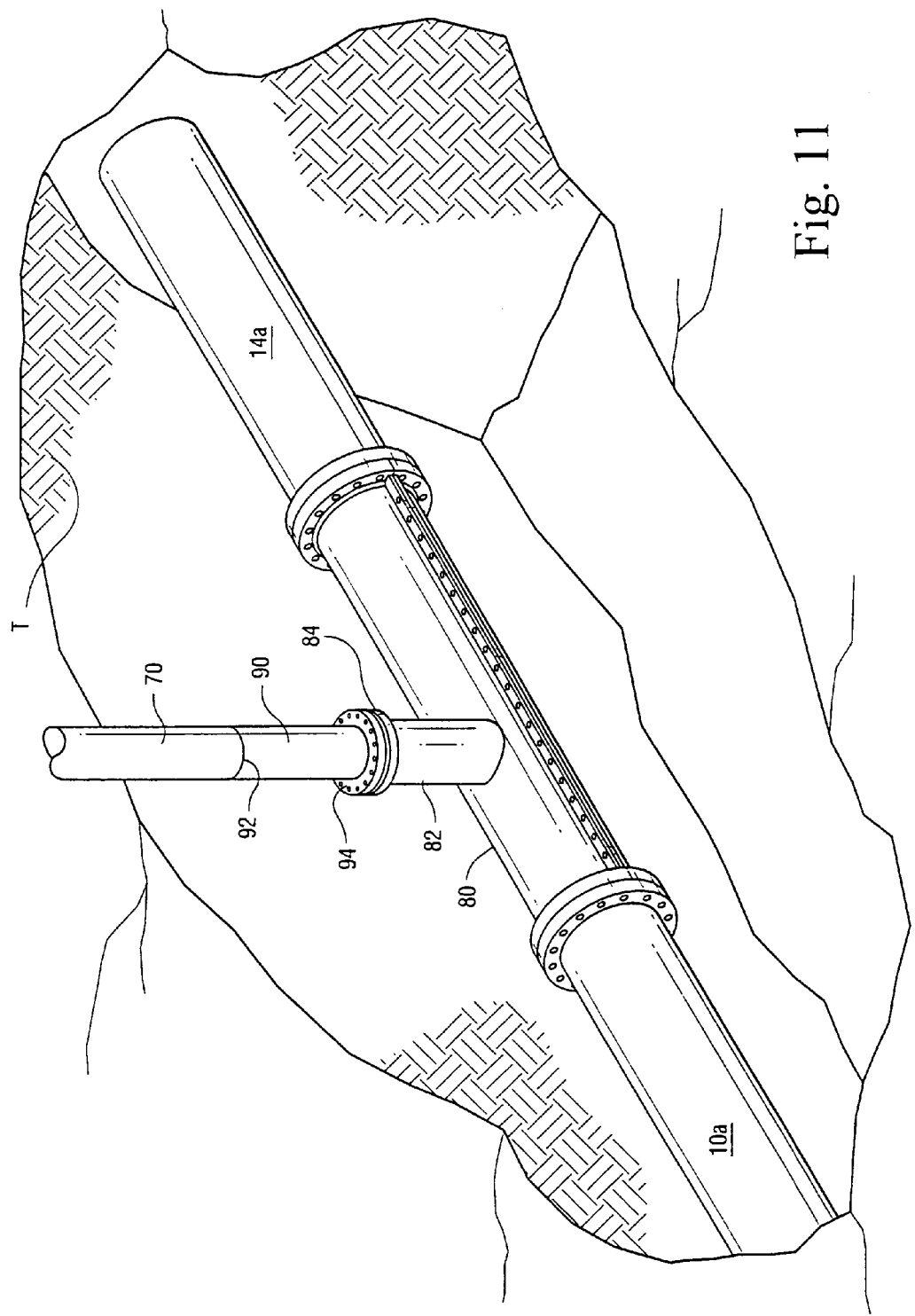
FIG. 11 is a perspective view illustrating the completed connection between the lined host pipe and the lateral pipe.

Referring to FIG. 10, the terminus of the sleeve 76 is cut and flared using a flaring tool, not shown, to form a flange 88 on the end of the sleeve in axial abutment against the end face of the flange 84 and radially within the bolt circle of flange 84. In FIG. 10, a pipe section 90 is secured to the lateral pipe 70, for example by welding at a seam line 92, the pipe section 90 terminating in a flange 94. The flanges 84 and 94 are then bolted to one another sealing the flange 88 between the flanges 84 and 94. It will be appreciated that the extension 82 on the split sleeve 80 constrains or confines the thermoplastic sleeve portion such that the fluid under pressure flowing through the lined host pipe and through the thermoplastic sleeve 76 of the lateral 70 remains sealed and does not blow through the liner.

Figure 12:
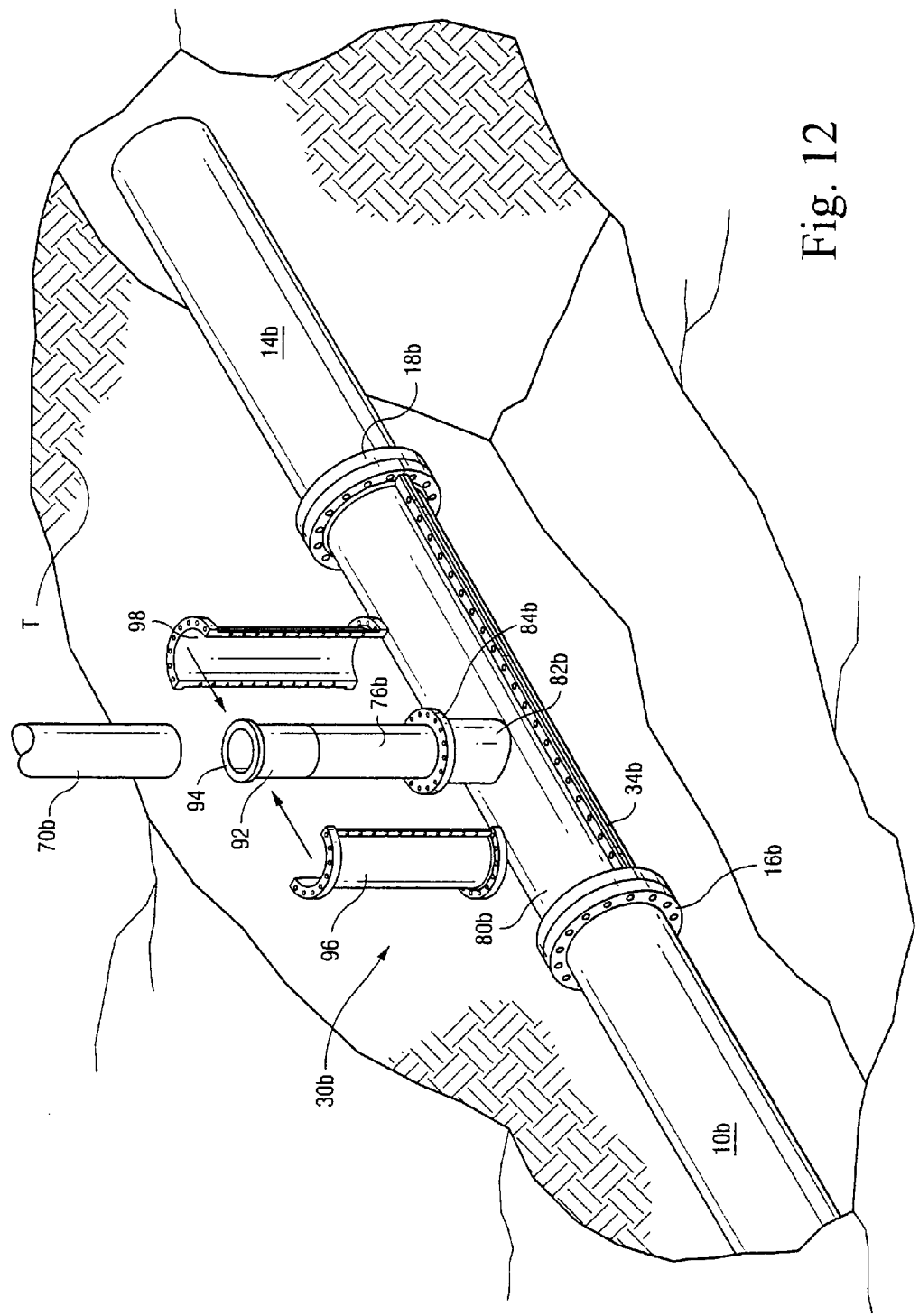
FIG. 12 is a perspective view illustrating a further embodiment for connecting a lined host pipe and a lateral pipe.
Figure 13:
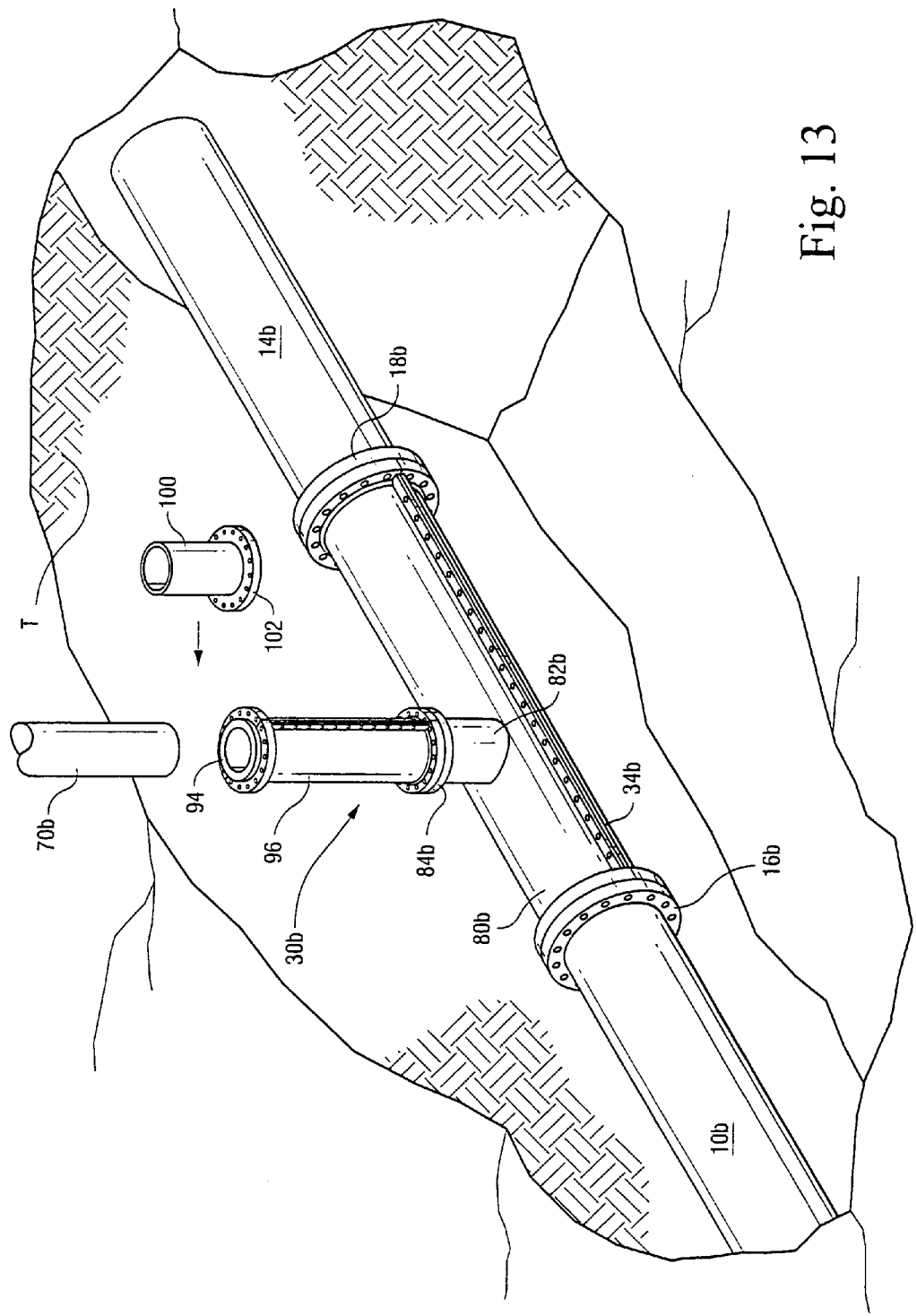
FIG. 13 is a view similar to FIG. 12 illustrating certain steps to effect the connection.
Figure 14:
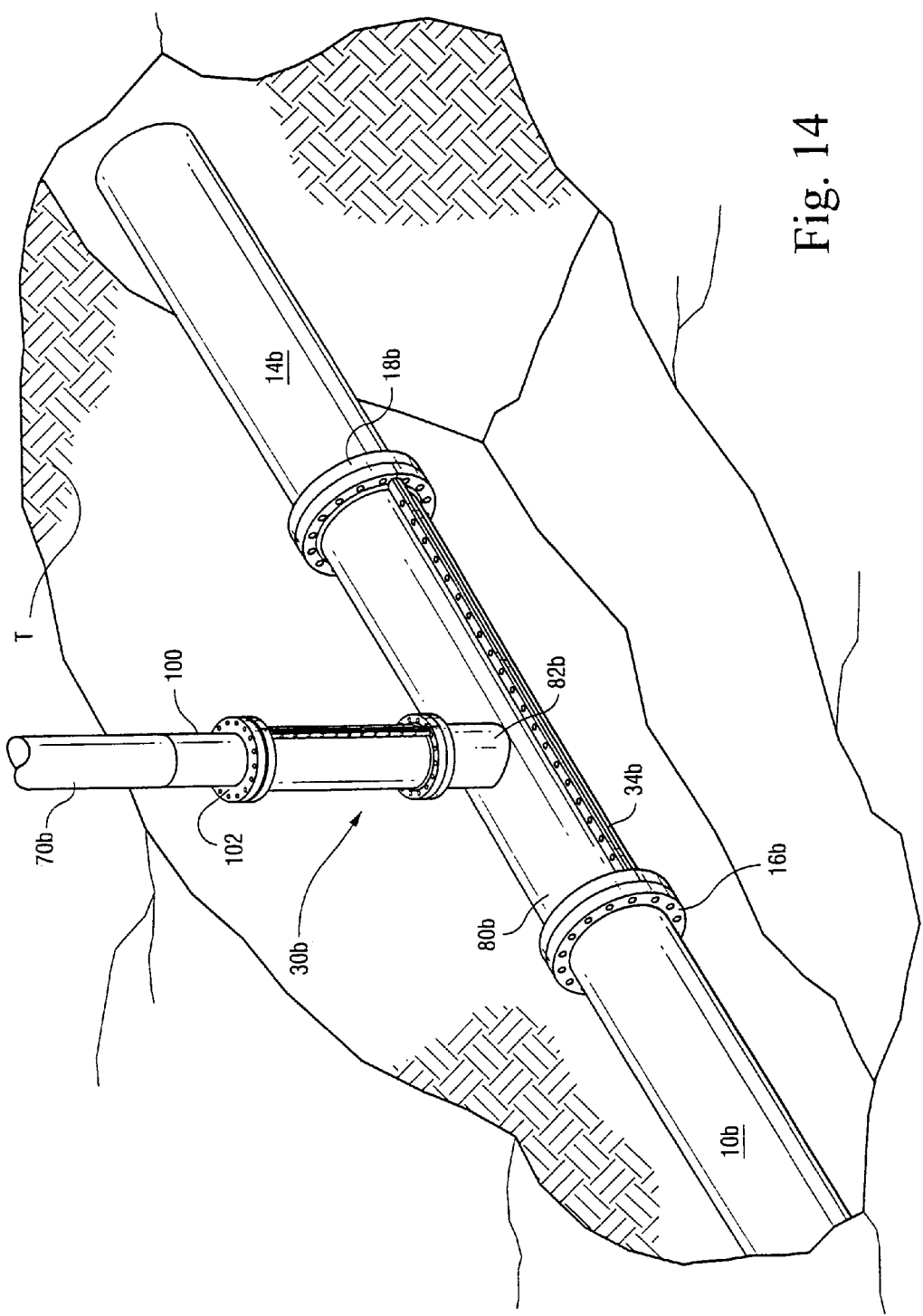
FIG. 14 illustrates the completed lined host pipe to lateral connection.

In a further embodiment illustrated in drawing FIGS. 12–14, wherein like reference numerals are applied to like parts as in the preceding embodiments followed by the letter "b", there is illustrated an alternative for connecting a lined host pipe 10*b* with a lateral pipe 70*b* wherein the pipes are pressure pipes. After rerounding the liner within the host pipe 10*b* and the adjacent pipe 14*b* with a split sleeve arrangement similar to split sleeve 30*a*, removal of one of the split sleeve halves and fusing a thermoplastic sleeve 76*b* to the rounded liner, a split sleeve half 80*b* similar to split sleeve half 80 illustrated in FIG. 9 is secured to the split sleeve half 34*b* with the thermoplastic sleeve 76*b* projecting through and from the end of extension 82*b*. The sleeve 76*b* may then be cut and a thermoplastic flange adapter 92 having a flange 94 on one end may be fused to the end of the cut sleeve 76*b*. The sleeve 76*b* is cut and the length of the flange adapter 92 is formed such that the distance between flange 94 of the adapter 92 and the flange 84*b* on extension 82*b* is known. A split sleeve 30*b* having a similar length dimension and inner diameter corresponding to the outer diameter of the sleeve 76*b* is bolted about the sleeve 76*b* and to flange 84*b*. That is, split sleeve halves 96 and 98 are bolted to one another and at one end to the flange 84*b*. The adapter flange 94 thus lies flush against the axial end flanges of the split sleeve 30*b* at its distal end. A cylindrical extension 100 preferably formed of metal is then secured, e.g. by welding, to the cut end of the lateral pipe 70*b* and terminates in a flange 102. The extension 100 is sized to have a length precisely fitting between the lateral 70*b* and the distal end flange of the split sleeve 30*b*. When the split sleeve 30*b* and extension flange 102 are bolted up with the adapter flange sealing therebetween, a sealed pressure fluid connection is thus formed for communicating pressure fluid through the lined host pipe and the lateral.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of lining a host pipe having a cylindrical cross-section and connecting the lined host pipe with a lateral pipe, comprising the steps of:
    (a) removing an intermediate section of the host pipe at a location in general registration with the lateral pipe, thereby leaving spaced apart opposed ends of the host pipe;
    (b) removing an end portion of the lateral pipe and forming a connecting end on the remaining portion of the lateral pipe;
    (c) securing a split sleeve to the opposed ends of the host pipe to form a continuation of the host pipe, the split sleeve including first and second longitudinally extending halves;
    (d) inserting a thermoplastic liner having a non-cylindrical cross-section into the host pipe and split sleeve;
    (e) reforming the liner within the host pipe and split sleeve to generally conform the liner to the inner diameter of the cylindrical host pipe and the inner diameter of the split sleeve;
    (f) removing at least one of the first and second split sleeve halves thereby generally registering a side portion of the reformed liner and the connecting end of the lateral pipe with one another;
    (g) fusing a thermoplastic pipe section to the registering side portion of the reformed liner;
    (h) forming an opening in the registering side portion of the reformed liner so that the liner is in communication with the pipe section fused to the liner;
    (i) securing a third split sleeve half and one of the first and second split sleeve halves between the opposed ends of the host pipe, whereby the third split sleeve half is overlying the registering side portion of the reformed liner, the third split sleeve half having a lateral pipe extension receiving the thermoplastic pipe section fused to the liner;
    (j) providing a first flange on a distal end of the fused pipe section;
    (k) coupling the lateral pipe extension to the connecting end of the lateral pipe.

2. The method according to claim 1, wherein the first flange is provided on the distal end of the fused pipe section by the terminus of the fused pipe section being cut and flared to form the first flange.

3. The method according to claim 2, wherein the lateral pipe extension is coupled to the connecting end of the lateral pipe by the lateral pipe extension being secured to the connecting end of the lateral pipe with the first flange between the lateral pipe extension and the lateral pipe.

4. The method according to claim 3, wherein the lateral pipe extension is terminated in a second flange, and wherein the first flange is formed to be in axial abutment against the second flange.

5. The method according to claim 4, wherein the first flange is in axial abutment against an end face of the second flange and radially within a bolt circle of the second flange.

6. The method according to claim 5, wherein and the connecting end of the lateral pipe is terminated in a third flange, and wherein the second flange of the lateral pipe extension is bolted to the third flange of the connecting end of the lateral pipe with the first flange between the second and third flanges.

7. The method according to claim 4 including the further step of sealing the first flange of the fused pipe section and the second flange of the lateral pipe extension to one another.

8. The method according to claim 1 wherein step (i) includes securing the third split sleeve half and another of the first or second split sleeve halves to one another to form a permanent connection between the spaced opposed ends of the host pipe and about the liner passing through the host pipe.

9. The method according to claim 1, wherein the first flange is provided on the distal end of the fused pipe section by cutting the fused pipe section and fusing to the end of the cut fused pipe section a thermoplastic flange adapter having the first flange on one end thereof.

10. The method according to claim 9 including the further steps of:
    (l) securing a second split sleeve to the lateral pipe extension and about the fused pipe section; and
    (m) securing the connecting end of the lateral pipe extension to the second split sleeve with the pipe section flange between the lateral pipe extension and the second split sleeve.

11. The method according to claim 10, wherein the lateral pipe extension is terminated in a second flange, the connecting end of the lateral pipe is terminated in a third flange, and the second split sleeve's ends terminate in fourth and fifth flanges, and wherein the second flange of the lateral pipe extension and the third flange of the connecting end of the lateral pipe are bolted to the fourth and fifth flanges of the second split sleeve.

12. The method according to claim 10 including the further step of sealing the flange of the fused pipe section between the second split sleeve and the connecting end of the lateral pipe to one another.

13. The method according to claim 1 wherein step (i) includes securing the third split sleeve half and another of the first or second split sleeve halves to one another to form a permanent connection between the spaced opposed ends of the host pipe and about the liner passing through the host pipe.

14. A method of lining a host pipe having a cylindrical cross-section and re-connecting the lined host pipe with a lateral pipe connected to the host pipe prior to the lining of the host pipe, the method comprising the steps of:
   (a) removing an intermediate section of the host pipe at a location including a section of the lateral pipe, thereby leaving spaced apart opposed ends of the host pipe;
   (b) removing with the intermediate section of the host pipe that portion of the lateral pipe connected to the host pipe, and forming a connecting end on the remaining portion of the lateral pipe;
   (c) securing a split sleeve to the opposed ends of the host pipe to form a continuation of the host pipe, the split sleeve including a first and second longitudinally extending halves;
   (d) inserting a thermoplastic liner having a non-cylindrical cross-section into the host pipe and split sleeve;
   (e) reforming the liner within the host pipe and split sleeve to generally conform the liner to the inner diameter of the cylindrical host pipe and the inner diameter of the split sleeve;
   (f) removing the first and second split sleeve halves to thereby expose the reformed liner;
   (g) fusing a thermoplastic pipe section to a side portion of the reformed liner so that the thermoplastic pipe section is in general registration with the connecting end of the lateral pipe;
   (h) forming an opening in the reformed liner so that the liner is in communication with the pipe section fused to the liner;
   (i) securing a third split sleeve half and one of the first and second split sleeve halves between the opposed ends of the host pipe, whereby the third split sleeve half is overlying the side portion of the reformed liner to which the thermoplastic pipe section is fused, the third split sleeve half having a lateral pipe extension receiving the thermoplastic pipe section fused to the liner;
   (j) providing a first flange on a distal end of the fused pipe section;
   (k) coupling the lateral pipe extension to the connecting end of the lateral pipe.

15. The method according to claim 14, wherein the first flange is provided on the distal end of the fused pipe section by the terminus of the fused pipe section being cut and flared to form the first flange.

16. The method according to claim 15, wherein the lateral pipe extension is coupled to the connecting end of the lateral pipe by the lateral pipe extension being secured to the connecting end of the lateral pipe with the first flange between the lateral pipe extension and the lateral pipe.

17. The method according to claim 14, wherein the first flange is provided on the distal end of the fused pipe section by cutting the fused pipe section and fusing to the end of the cut fused pipe section a thermoplastic flange adapter having the first flange on one end thereof.

18. The method according to claim 17 including the further steps of:
   (l) securing a second split sleeve to the lateral pipe extension and about the fused pipe section; and
   (m) securing the connecting end of the lateral pipe to the second split sleeve with the pipe section flange between the lateral pipe and the second split sleeve.

* * * * *